(12) United States Patent
Kawashima

(10) Patent No.: US 11,031,764 B2
(45) Date of Patent: Jun. 8, 2021

(54) WIRE UNIT

(71) Applicant: Sumitomo Wiring Systems, Ltd., Yokkaichi (JP)

(72) Inventor: Yuji Kawashima, Yokkaichi (JP)

(73) Assignee: Sumitomo Wiring Systems, Ltd.

(*) Notice: Subject to any disclaimer, the term of this patent is extended or adjusted under 35 U.S.C. 154(b) by 32 days.

(21) Appl. No.: 16/614,462

(22) PCT Filed: May 7, 2018

(86) PCT No.: PCT/JP2018/017576
§ 371 (c)(1),
(2) Date: Nov. 18, 2019

(87) PCT Pub. No.: WO2018/216450
PCT Pub. Date: Nov. 29, 2018

(65) Prior Publication Data
US 2020/0083691 A1    Mar. 12, 2020

(30) Foreign Application Priority Data
May 24, 2017   (JP) .............. JP2017-102337

(51) Int. Cl.
*H02G 3/34* (2006.01)
*F16B 17/00* (2006.01)

(52) U.S. Cl.
CPC .......... *H02G 3/34* (2013.01); *F16B 17/006* (2013.01)

(58) Field of Classification Search
CPC .......... H02G 3/34; H02G 3/32; F16B 17/006; F16B 17/00; F16B 9/05; F16B 9/056
USPC ...................................................... 174/480
See application file for complete search history.

(56) References Cited

U.S. PATENT DOCUMENTS

| 2,855,648 | A | * | 10/1958 | Jansson | F16L 3/227 403/219 |
| 3,508,730 | A | * | 4/1970 | Knezojohn, Jr. | F16L 3/04 248/73 |
| 4,094,483 | A | * | 6/1978 | Busch | F16B 5/0685 248/222.12 |
| 4,679,754 | A | * | 7/1987 | Richards | F16L 3/23 24/458 |
| 5,149,026 | A | * | 9/1992 | Allen | F16L 3/227 248/68.1 |

(Continued)

FOREIGN PATENT DOCUMENTS

| JP | 3-88297 | 9/1991 |
| JP | 2000-36673 | 2/2000 |
| JP | 2014-199069 | 10/2014 |

OTHER PUBLICATIONS

International Search Report dated Jun. 26, 2018.

*Primary Examiner* — Timothy J Thompson
*Assistant Examiner* — Michael F McAllister
(74) *Attorney, Agent, or Firm* — Gerald E. Hespos; Michael J. Porco; Matthew T. Hespos

(57) ABSTRACT

Provided is a wiring unit in which it is possible to limit the height dimension. The wiring unit is provided with a plurality of electrical wires, a plate on which a support surface for supporting each of the electrical wires is formed, and a holding member. The holding member has a flat pressing surface arranged to be approximately parallel with the support surface of the plate. The electrical wires are arranged in a row and held between the pressing surface and the support surface.

2 Claims, 4 Drawing Sheets

(56) References Cited

U.S. PATENT DOCUMENTS

| | | |
|---|---|---|
| 5,266,865 A | 11/1993 | Haizumi et al. |
| 9,592,776 B2 * | 3/2017 | Fujita .................. B60R 16/0215 |
| 2016/0031390 A1 | 2/2016 | Kawashima et al. |
| 2016/0039367 A1 * | 2/2016 | Yoshida .............. B60R 16/0215 |
| | | 174/70 R |

* cited by examiner

WIRE UNIT

BACKGROUND

Field of the Invention

The present disclosure relates to a wire unit.

Related Art

Japanese Laid-Open Patent Publication No. 2014-199069 describes a wire unit installed in an automatic transmission of an automobile. The wire unit includes multiple electrical wires and a retaining plate that includes a support surface supporting the electrical wires. The retaining plate is formed integrally with a pushing portion. The pushing portion includes a side piece projecting from the support surface and a pushing piece that is orthogonally bent from the rising edge of the side piece. The pushing portion is maintained in an L-shaped configuration as a whole. The electrical wires are inserted through a protection tube and inserted from sideward in a press-fitting manner into a gap between the pushing piece and the support surface so that the electrical wires are retained.

In the configuration described above, the electrical wires are stacked on one another and retained between the pushing piece of the pushing portion and the support surface of the retaining plate. This increases the size of the wire unit in the height-wise direction, that is, the stacking direction of the electrical wires (direction extending away from the support surface). As a result, the wire unit may interfere with a member located adjacent to the wire unit in the height-wise direction in the automatic transmission. Hence, there is room for improvement.

The present disclosure is presented in response to issues such as those described above. It is an object of the present disclosure to provide a wire unit that is reduced in a height-wise dimension.

SUMMARY

A wire unit of the present disclosure includes multiple electrical wires, a plate including a support surface that supports the electrical wires, a retaining member including a flat pressing surface disposed parallel to the support surface, in which the retaining member arranges the electrical wires in a single row and retains the electrical wires between the pressing surface and the support surface, and a protection tube that covers the electrical wires. The retaining member is formed from metal and has a rectangular cross section. The retaining member includes a pressing piece and two retaining pieces. The pressing piece extends in a direction in which the electrical wires are arranged and includes the pressing surface. The retaining pieces project to oppose each other from opposite ends of the pressing piece. Each of the retaining pieces is directed toward a rear surface of the plate opposite to the support surface. A portion of each of the retaining pieces projecting from the rear surface is bent and swaged along the rear surface. The protection tube is held between the retaining member and the electrical wires.

The electrical wires are pressed by the flat pressing surface of the retaining member toward the support surface of the plate so that the electrical wires are arranged in a single row and retained between the pressing surface and the support surface. Thus, increases in the size of the wire unit in the height-wise direction, in which the electrical wires are separated from the support surface, are avoided. As a result, when installed, interference of the wire unit with peripheral members is readily avoided. In addition, it is ensured that the retaining member is retained on the predetermined position of the plate, and the state in which the electrical wires are retained in a single row arrangement is steadily maintained. In addition, the retaining member is readily shaped, and the configuration may be flexible corresponding to changes in the thickness of the plate. In addition, since the portions of the retaining pieces projecting at the rear surface side are bent and swaged along the rear surface of the plate, it is ensured that separation of the retaining member from the plate is restricted.

The retaining member may include a pressing piece and two retaining pieces. The pressing piece may extend in a direction in which the electrical wires are arranged and may include the pressing surface. The retaining pieces may project to oppose each other from opposite ends of the pressing piece. Each of the retaining pieces may be directed toward a rear surface of the plate opposite to the support surface and hooked on the rear surface to restrict separation of the retaining member from the plate. This configuration ensures that the retaining member is retained on the predetermined position of the plate, and the state in which the electrical wires are retained in a single row arrangement is maintained steadily.

The plate may include slots into which the respective retaining pieces are inserted and positioned. In this configuration, the retaining member is coupled reliably and steadily to the predetermined position of the plate.

DETAILED DESCRIPTION

Figure 1:
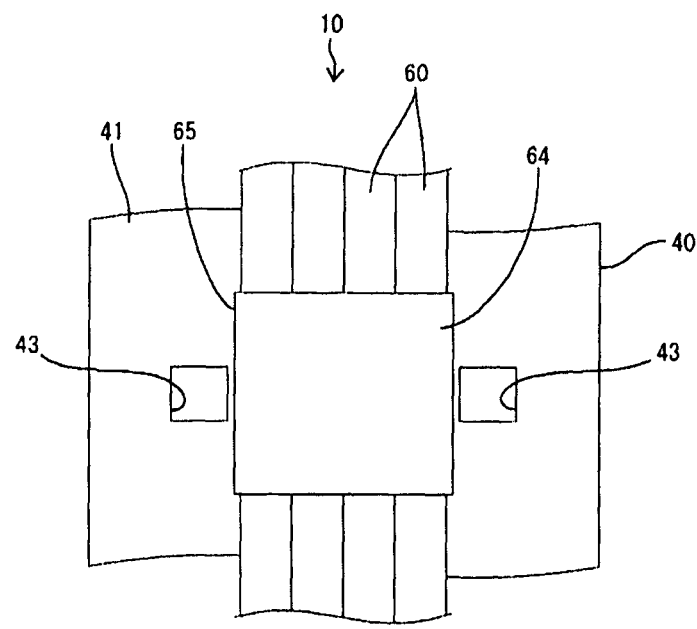
FIG. 1 is a plan view showing a first embodiment of a wire unit according to the present disclosure in a state in which a wire bundle part including electrical wires is arranged between slots formed in a plate.
Figure 2:
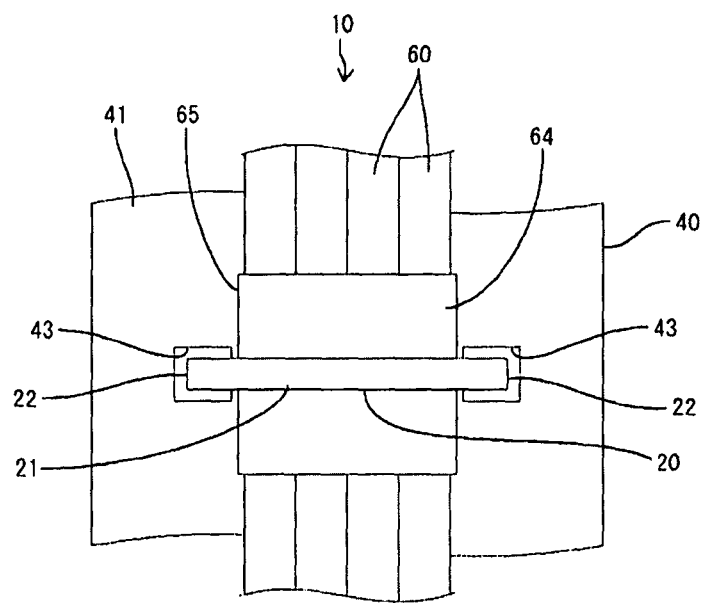
FIG. 2 is a plan view showing a state in which retaining pieces of a retaining member are inserted into the slots of the plate.
Figure 3:
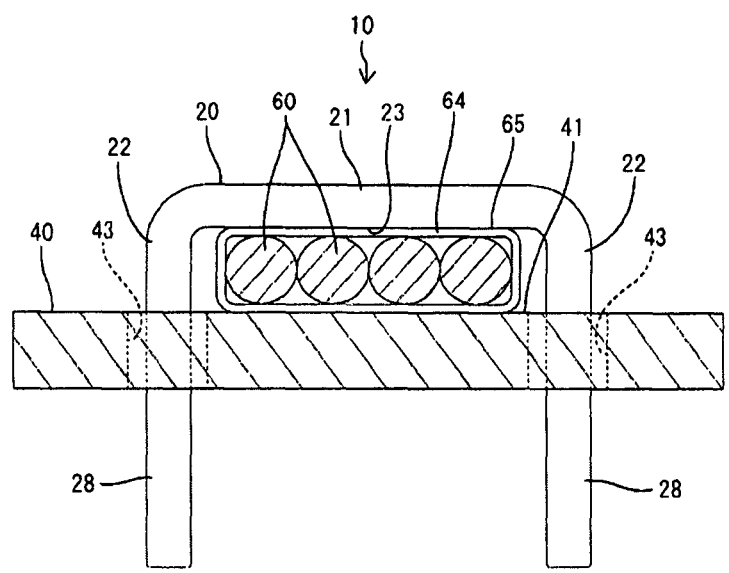
FIG. 3 is a partial cross-sectional view taken from front showing a state in which the retaining pieces of the retaining member are inserted into the slots of the plate.

A first embodiment will now be described with reference to FIGS. 1 to 7. A first embodiment of a wire unit 10 is installed in an automatic transmission of an automobile and is used in a portion of control related to transmission operation. The wire unit 10 includes multiple electrical wires 60 configured to connect various electric components such as a ROM and a connector (not shown) to each other, a plate 40 supporting the electrical wires 60, and multiple retaining members 20 (only one shown) that retain the electrical wires 60 between a support surface 41 of the plate 40 and the retaining members 20 on a predetermined position in the routing path of the electrical wires 60.

Figure 8:
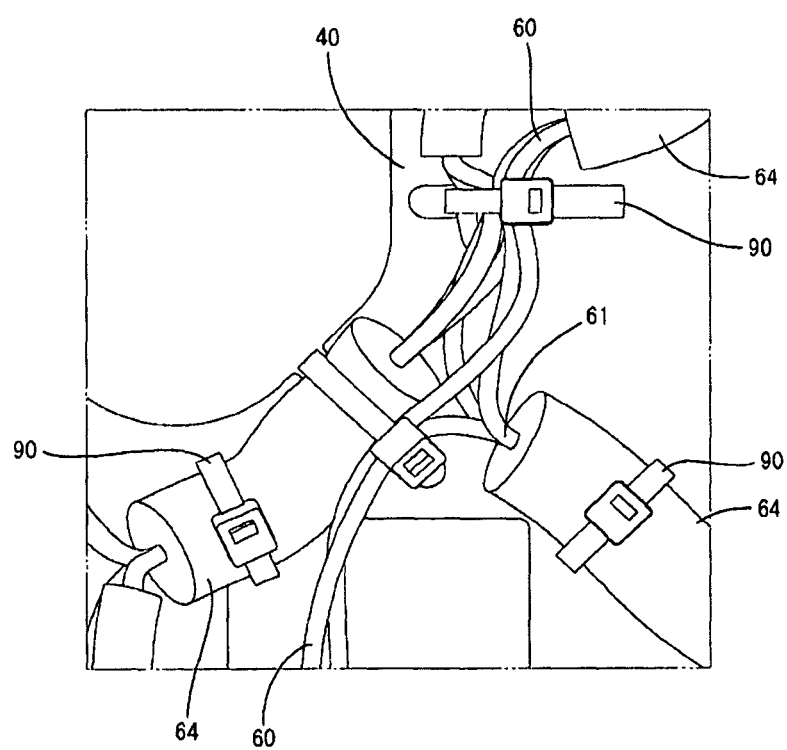
FIG. 8 is a plan view showing a reference example of a wire unit.

Each electrical wire 60 is a coated electrical wire having a circular cross section. Although not shown in the drawings, the electrical wire 60 is configured so that multiple core wires are enclosed with an insulation resin. A number (four in the drawings) of electrical wires 60 are configured to be a group and covered with a protection tube 64 through a predetermined range in the longitudinal direction. The protection tube 64 is a flexible tubular rubber material and is held between the retaining member 20 and the electrical wires 60 to protect the electrical wires 60. Protection tubes 64 are arranged on different positions in the routing path of each electrical wire 60 (refer to FIG. 8 showing reference example). In the description below, the part configured by the electrical wires 60 and the protection tube 64 covering the electrical wires 60 is referred to as a wire bundle part 65.

The plate 40 is formed, for example, by three-dimensionally bending a metal plate and is fastened to the body of the automatic transmission with bolts (not shown). As in the reference example shown in FIG. 8, the electrical wires 60 include a division portion 61 in an intermediate portion of the routing path. The division portion 61 is used to configure a division circuit. In the reference example shown in FIG. 8, cable ties 90 (tying bands) are arranged to tie and fix the electrical wires 60 at positions corresponding to the division portion 61. The division circuit is configured through the cable ties 90. In the first embodiment, the retaining members 20 may be used instead of the cable ties 90. Thus, the retaining members 20 may be arranged on positions in the routing path corresponding to the division portion 61.

The periphery of the plate 40 includes a flat support surface 41, and the wire bundle part 65 is mounted on the support surface 41. In a position where the retaining member 20 is arranged on the support surface 41, the plate 40 includes two slots 43 separate from each other by a predetermined distance. Each slot 43 has a rectangular cross section and extends through the plate 40 in the thickness-wise direction.

Figure 4:
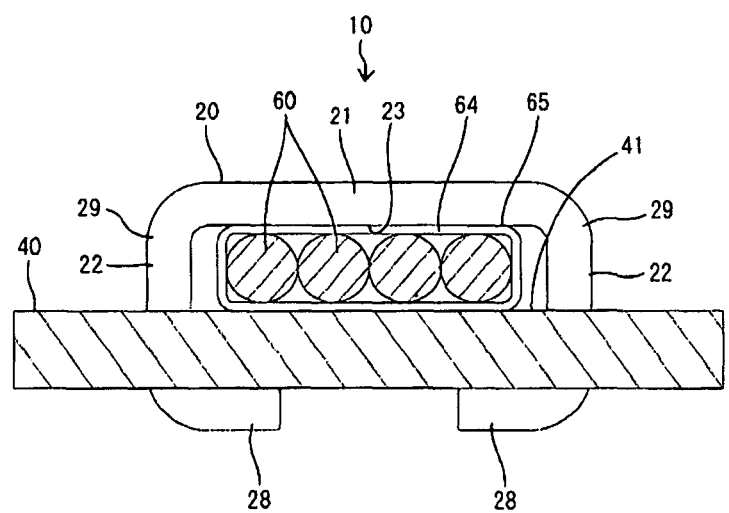
FIG. 4 is a partial cross-sectional view taken from front showing a state in which the retaining pieces of the retaining member inserted into the slots of the plate are swaged and fixed to the plate.
Figure 5:
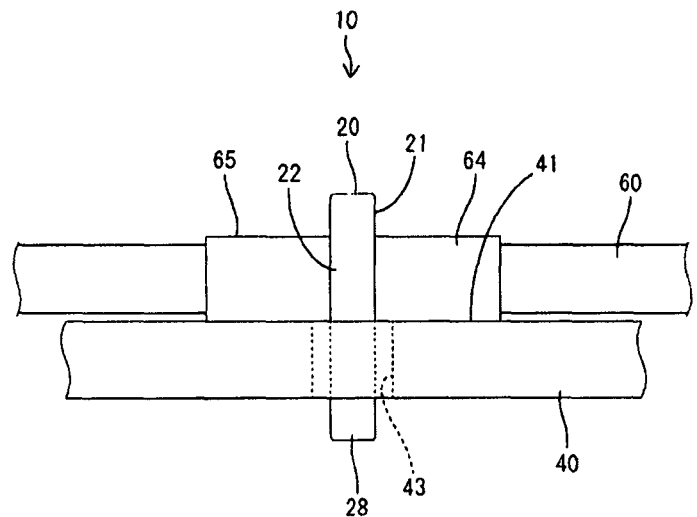
FIG. 5 is a side view showing a state in which the retaining pieces of the retaining member inserted into the slots of the plate are swaged and fixed to the plate.
Figure 6:
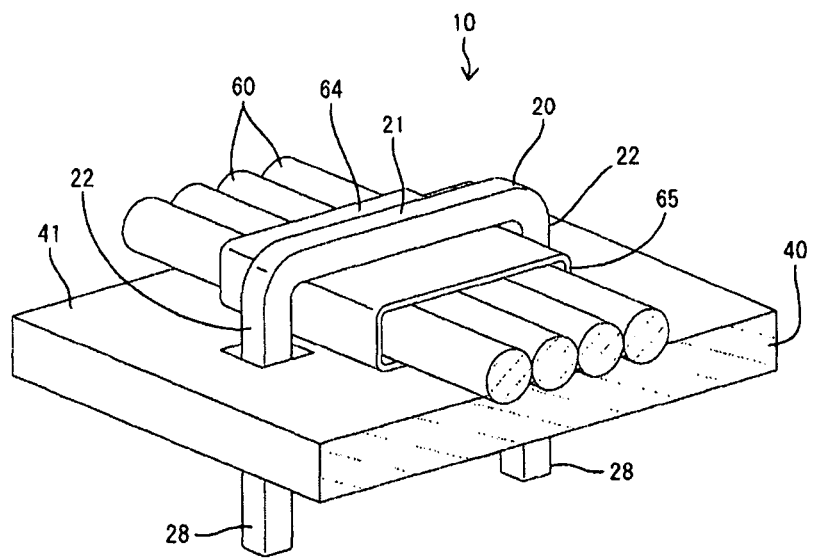
FIG. 6 is a perspective view showing a state in which the retaining pieces of the retaining member are inserted into the slots of the plate.
Figure 7:
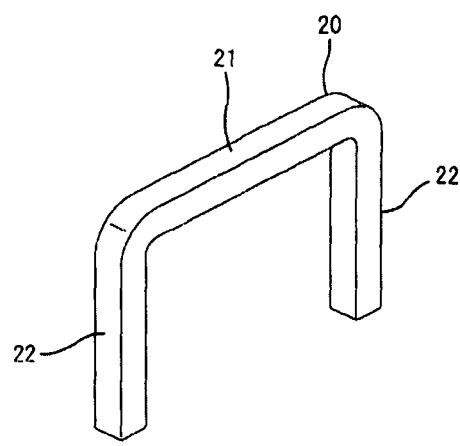
FIG. 7 is a perspective view of the retaining member.

The retaining member 20 is a metal wire member and has a rectangular cross section that is substantially constant throughout the full length of the retaining member 20. The retaining member 20 is hooked and retained on the plate 40. As shown in FIG. 7, before the retaining member 20 is hooked and retained on the plate 40, the retaining member 20 includes a pressing piece 21 extending in the sideward direction (width-wise direction, or direction in which electrical wires 60 are arranged), and two retaining pieces 22 extending parallel to each other and opposed to each other from opposite sideward ends of the pressing piece 21. The retaining member 20 is gate-shaped as a whole. The sideward interval between the retaining pieces 22 is set to be substantially the same as the sideward interval between the two slots 43. As shown in FIG. 4, the pressing piece 21 includes an inner surface (surface from which the retaining pieces 22 project) defining a pressing surface 23 that is flat in the sideward direction.

During coupling, the electrical wires 60 are routed along the routing path on the support surface 41 of the plate 40. The wire bundle part 65 is disposed between the slots 43 of the plate 40, and the electrical wires 60 are arranged next to each other in a substantially single row in the protection tube 64 (refer to FIG. 1).

Subsequently, the pressing surface 23 of the pressing piece 21 is arranged to be opposed to the support surface 41 of the plate 40. In this state, the retaining member 20 is lowered, and the retaining pieces 22 are inserted into the slots 43 of the plate 40. As a result, the pressing surface 23 of the pressing piece 21 comes into contact with the protection tube 64 and presses the wire bundle part 65 toward the support surface 41, and a distal portion 28 of each retaining piece 22 projects toward the rear surface (opposite to the support surface 41) of the plate 40 (refer to FIG. 3).

Next, the distal portions 28 of the retaining pieces 22 (portion of each retaining piece 22 projecting toward the rear surface of the plate 40) are mechanically bent by a swaging jig (not shown) to an inner side (side where the distal portions 28 approach each other) and disposed to be contactable with the rear surface of the plate 40 (refer to FIG. 4). At this time, the distal portions 28 of the retaining pieces 22 are opposed to each other and separated from each other by a slight gap in the sideward direction.

As described above, when the retaining pieces 22 are swaged, the wire bundle part 65 is firmly pressed to the support surface 41 of the plate 40 by the pressing piece 21 and held between the pressing piece 21 and the plate 40. The pressing surface 23 of the pressing piece 21 is substantially parallel to the support surface 41 of the plate 40 and is separated from the support surface 41 of the plate 40 by a distance corresponding to the thickness of the wire bundle part 65 in the height-wise direction. The electrical wires 60 are leveled along the pressing surface 23 of the pressing piece 21 and arranged in the protection tube 64 in a single row in the sideward direction without being stacked in the height-wise direction (vertical direction in FIG. 4) nor being separated from each other. Further, each retaining piece 22 includes a basal portion 29 (portion of the retaining piece 22 projecting toward the front surface of the plate 40). The basal portions 29 are closely disposed at the left and right sides of the wire bundle part 65 (refer to FIG. 4). As a result, the wire bundle part 65 is fixed to the plate 40 with the retaining member 20.

As described above, in the first embodiment, the electrical wires 60 are pressed toward the support surface 41 of the plate 40 by the flat pressing surface 23 of the retaining member 20 so that the electrical wires 60 are arranged in a single row and retained between the pressing surface 23 and the support surface 41. Thus, increases in the size of the wire unit 10 in the height-wise direction, that is, the direction in which the electrical wires 60 are separated from the support surface 41, are avoided. As a result, when installed, interference of the wire unit 10 with peripheral members (not shown) is readily avoided.

In addition, the retaining member 20 includes the pressing piece 21 extending in a direction in which the electrical wires 60 are arranged, and the two retaining pieces 22 projecting from the opposite sideward ends of the pressing piece 21 opposed to each other. The retaining pieces 22 are directed toward the rear surface of the plate 40 and hooked on the rear surface by swaging. Thus, separation of the retaining member 20 from the plate 40 is restricted. This ensures that the retaining member 20 is retained on the predetermined position of the plate 40, and the state in which the electrical wires 60 are retained in a single row arrangement is steadily maintained.

In addition, the retaining member 20 is formed from metal, and the distal portions 28 of the retaining pieces 22 are bent. Thus, the configuration may be flexible corresponding to changes in the thickness of the plate 40. In addition, since the distal portions 28 of the retaining pieces 22 are bent and swaged along the rear surface of the plate 40, it is ensured that separation of the retaining member 20 from the plate 40 is restricted.

In addition, the plate 40 includes the two slots 43, into which the retaining pieces 22 are inserted and positioned. Thus, the retaining member 20 is reliably and steadily coupled to the predetermined position of the plate 40.

Other embodiments will now be briefly described.

Each electrical wire may include a portion that is tied with a cable tie in addition to the retaining member when the electrical wire is supported by the support surface of the plate.

Each retaining piece may be configured to surround a strip-shaped plate to be coupled to the plate without being inserted into a slot in the plate.

The retaining member may be configured by a wide plate.

The plate may be formed from a synthetic resin.

Installation of the wire unit according to the present invention is not limited to an automatic transmission of an automobile. The wire unit may be widely used in a location that needs a retaining member and a plate corresponding to the configuration described above.

DESCRIPTION OF THE REFERENCE CHARACTERS

10 . . . wire unit
20 . . . retaining member
21 . . . pressing piece
22 . . . retaining piece
23 . . . pressing surface
40 . . . plate
41 . . . support surface
43 . . . slot
60 . . . electrical wire

The invention claimed is:

1. A wire unit, comprising:
multiple electrical wires;
a plate including a support surface that supports the electrical wires;
a retaining member including a flat pressing surface disposed parallel to the support surface, wherein the retaining member arranges the electrical wires in a single row and retains the electrical wires between the pressing surface and the support surface, and
a protection tube that covers the electrical wires; wherein
the retaining member is formed from metal and has a rectangular cross section,
the retaining member includes a pressing piece and two retaining pieces,
the pressing piece extends in a direction which the electrical wires are arranged and includes the pressing surface,
the retaining pieces project to oppose to each other from opposite ends of the pressing piece,
each of the retaining pieces is directed toward a rear surface of the plate opposite to the support surface,
a portion of each of the retaining pieces projecting from the rear surface is bent and swaged along the rear surface, and
the protection tube is held between the retaining member and the electrical wires.

2. The wire unit according to claim 1, wherein the plate includes slots into which the retaining pieces are respectively inserted and positioned.

* * * * *